United States Patent [19]

Aoshima

[11] Patent Number: 4,964,157
[45] Date of Patent: Oct. 16, 1990

[54] CONFERENCE SPEECH-CHANNEL FORMING METHOD BASED ON PRIVATE BRANCH EXCHANGE AND ITS CONFERENCE TELEPHONE SYSTEM

[75] Inventor: Akihiko Aoshima, Hino, Japan

[73] Assignee: Kabushiki Kaisha Toshiba, Kawasaki, Japan

[21] Appl. No.: 457,235

[22] Filed: Dec. 26, 1989

[30] Foreign Application Priority Data

Dec. 27, 1988 [JP] Japan .................................. 63-330705

[51] Int. Cl.⁵ ............................................. H04M 3/56
[52] U.S. Cl. ..................................... 379/204; 379/205
[58] Field of Search ............... 379/158, 202, 203, 204, 379/205

[56] References Cited

U.S. PATENT DOCUMENTS 4,611,095  9/1986  Leblanc et al. ...................... 379/204

Primary Examiner—Stafford D. Schreyer
Attorney, Agent, or Firm—Finnegan, Henderson, Farabow, Garrett, and Dunner

[57] ABSTRACT

A conference speech-channel forming method and its conference telephone system, in which an extension telephone set to be operated by an operator as the chairman of a conference is connected in a predetermined logical manner through a private branch exchange to a plurality of extension telephone sets to be operated by a plurality of operators as the participators of the conference to form conference speech channels between these extension telephone sets. That is, the conference speech channels are formed so that (a) a voice signal issued from the extension telephone set of the chairman operator is parallelly transmitted in one way to all the plurality of extension telephone sets of the plurality of participator operators, and (b) voice signals issued from the plurality of extension telephone sets of the participator operators are added together at a voice adder circuit and then transmitted to the extension telephone set of the chairman operator. In this case, mutual speeches between the chairman and participators are allowed only in a one-to-plurality relationship. In addition, mutual speeches between the participators other than the chairman are restricted. Thus, even in the event where the number of participators in a conference is large, the chairman operator can smoothly expedite the proceedings of the conference.

13 Claims, 9 Drawing Sheets

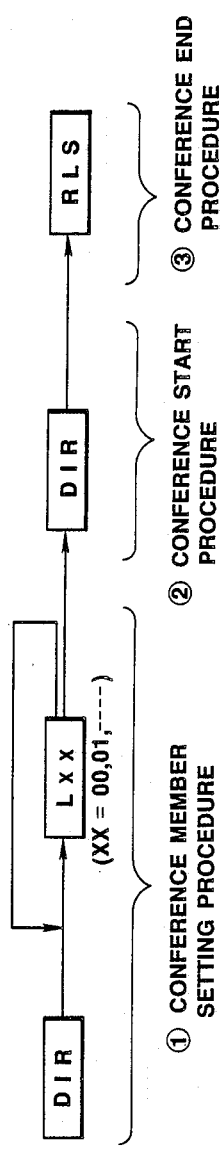

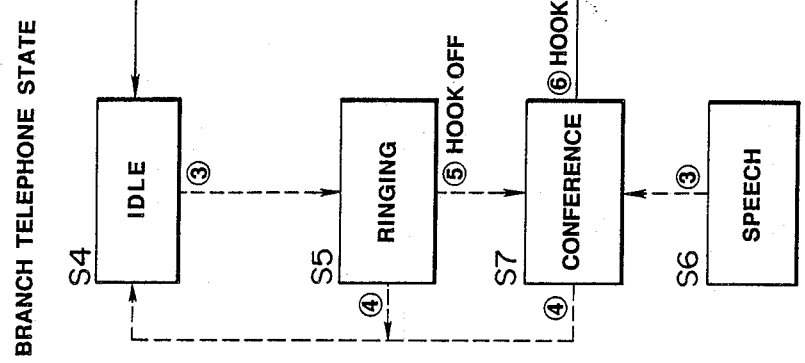
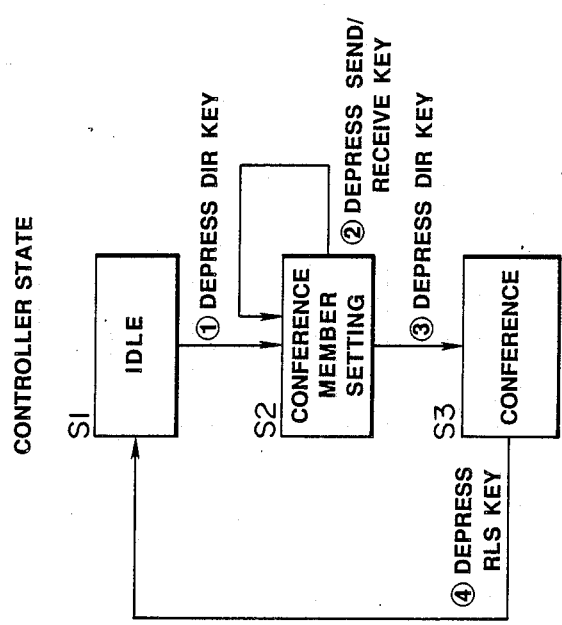

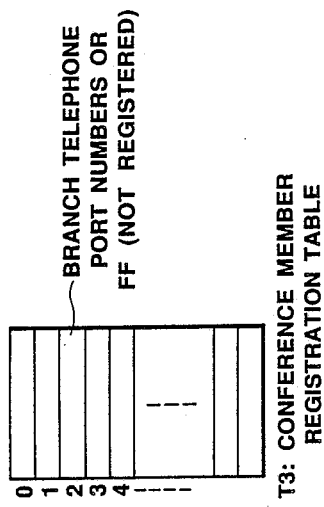
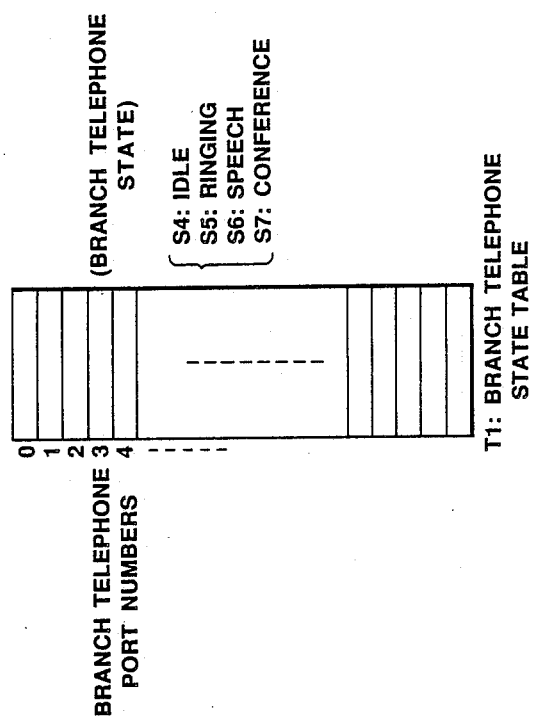
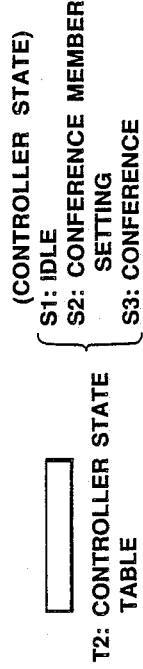

CONFERENCE SPEECH-CHANNEL FORMING METHOD BASED ON PRIVATE BRANCH EXCHANGE AND ITS CONFERENCE TELEPHONE SYSTEM

BACKGROUND OF THE INVENTION

1. Field of the Invention

The present invention relates to methods of forming conference channels by utilizing an electronic private branch exchange and conference telephone (call) systems embodying the conference-channel forming methods and, more particularly, to a conference-channel forming method based on a private branch exchange and a conference telephone system embodying the method in which, even when conference speeches are carried out among a relatively large number of conference participators, a conference convoker can sufficiently hold the command of the conference speeches and can expedite the proceedings without losing his or her initiative.

2. Description of the prior Art

When it is desired to have a telephone conference (speeches among three or more parties) through a conference telephone system based on a private branch exchange, there has been so far employed such a method that a plurality of operators as participators of the conference talk with each other through their extension telephones and an operator playing a role of a chairman (usually, the operator at the conference convoker terminal) mediate their opinions among the participators.

In such a prior art conference telephone system that allows mutual conversations between the operators as the conference participator members through their extension telephones, when the number of participator members becomes too large, it becomes difficult for the chairman operator to discriminate the identity of the talkers and thus to mediate their opinions, which results in that the maximum number of participator members is limited to usually about 6.

In actual applications, a telephone conference is often carried out among more than 7 participator members. In such a case, the above prior art conference telephone system has had such a problem that the conference convoker cannot have the initiative in the conference and when all the participator members start talking with each other at a time, it often becomes difficult for him to secure the command of the conference.

In this way the prior art conference telephone system based on the private branch exchange has had many problems which include the following, because the system allows free mutual talks between the operators a the respective extension telephones.

(1) The system tends to easily incur the confusion of speeches.
(2) It becomes difficult for the conference caller to have the initiative of the conference and thus sometimes difficult to hold the command of the conference.
(3) The system is not suitable for such a telephone conference application, in particular, that the number of conference participator members exceeds 6.

SUMMARY OF THE INVENTION

In view of the above circumstances in the prior art conference telephone system, it is an object of the present invention to provide a conference speech-channel forming method based on a private branch exchange and its conference telephone system, which can avoid the speech confusion between mutual speeches of operators as conference participator members at respective extension telephone sets and which, even when the number of participators in a conference exceeds 7, enables a conference convoker to have the initiative in the conference and to reliably hold the command of the conference.

In accordance with the present invention, the above object is attained by connecting in a predetermined logical manner an extension telephone set to be operated by an operator as the chairman of a conference to a plurality of extension telephone sets to be operated by a plurality of operators as the participators of the conference through a private branch exchange to form conference speech channels between these extension telephone sets. The conference speech channels are formed at least so that (a) a voice signal issued from the extension telephone set of the chairman operator is parallelly transmitted in one way to all the extension telephone sets of the participator operators, and (b) voice signals issued from the extension telephone sets of the participator operators are added together at a voice adder circuit and then transmitted to the extension telephone set of the chairman operator.

Thus, mutual speeches between the chairman and participators are allowed only in a one-to-plurality relationship. In addition, mutual speeches between the participators other than the chairman are restricted. Thus, even in the event where the number of participators in a conference becomes large, the conference convoker (chairman) can smoothly expedite the proceedings of the conference while having the initiative in the conference and avoiding the confusion of the speeches, as in the case where the number of conference participators is small.

BRIEF DESCRIPTION OF THE DRAWINGS

FIG. 4 shows, in a model form, an example of key operating procedure in the controller 1 when a telephone conference is executed through the system of FIG. 1 and with use of the controller of FIG. 2;

FIGS. 5a–5state transition charts expressing the state transition of the controller 1 and each of extension telephone sets in a conference speech mode of the conference telephone system respectively;

FIGS. 6a–6b schematically shows examples of various data tables prepared in a memory 7 in the conference telephone system;

DESCRIPTION OF THE PREFERRED EMBODIMENTS

Figure 1:
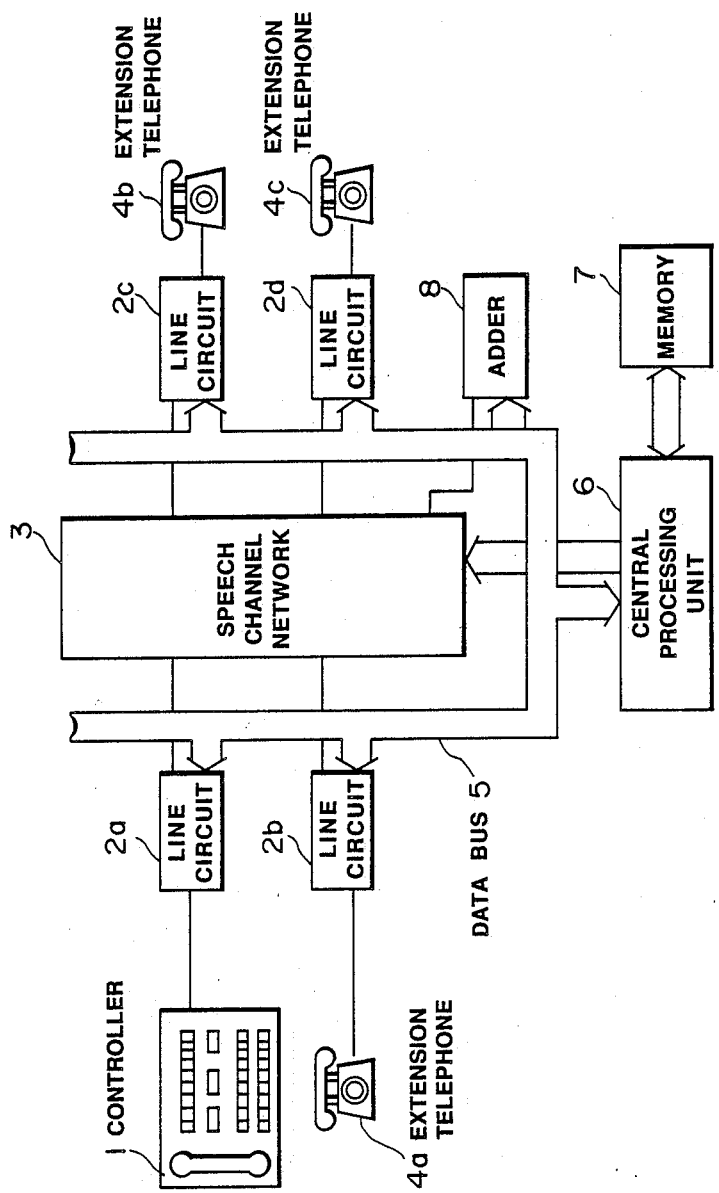
FIG. 1 is a block diagram showing an embodiment of a conference telephone system in accordance with the present invention.

Referring to FIG. 1, there is shown an embodiment of a conference telephone system in accordance with the present invention, which comprises a controller 1, line circuits 2a to 2d, a speech channel network 3 in a private branch exchange, extension telephone sets 4a to 4c, a data bus 5, a central processing unit 6, a memory 7 and an adder circuit (voice adder circuit) 8.

In the illustrated embodiment, the controller 1, which is an extension telephone set having a special function such as a conference calling or convoking function to be explained later, functions to generally control the other extension telephone sets 4a to 4c (hereinafter, which will be sometimes referred to as the branch telephone sets) based on the conference convoking function. The controller 1 is operated mainly by an operator as a conference convoker, i.e., a chairman.

Figure 2:
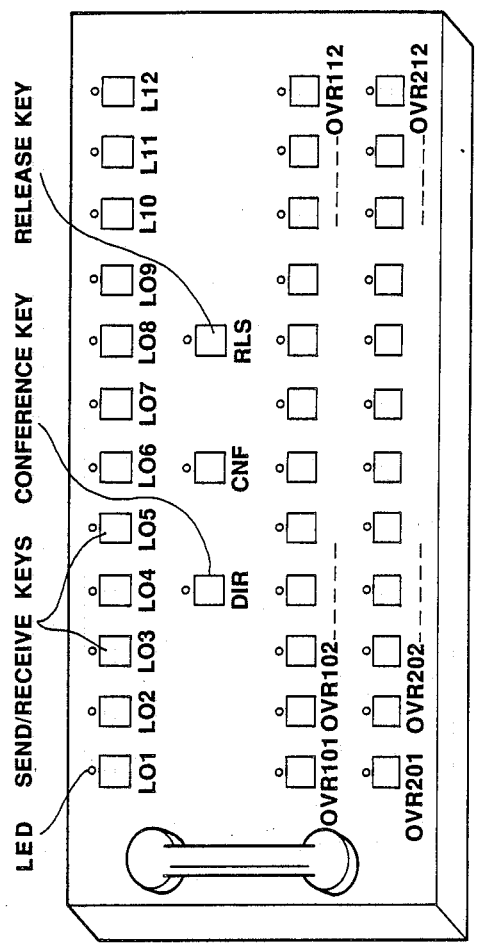
FIG. 2 is an enlarged, schematic perspective view of an controller 1 used in the system of FIG. 1.

FIG. 2 is a perspective view of the controller 1 showing its appearance structure. As shown in the drawing, the controller 1 is provided thereon with various sorts of function keys which include a plurality of send-/receive keys L01 to L12 to be depressed by an operator (playing a role of a chairman) for individually calling the respective branch telephone sets or for individually accepting incoming calls from the branch telephone sets, and also include a conference key (DR) to be operated by the chairman operator when he or she desires to convoke a conference and a release key (RLS) to be operated by the chairman operator when he or she desires to put an end to the conference.

Speeches between the controller 1 and the respective branch telephone sets 4a to 4d can be realized through the following key operations. When no conference convoking function is provided through the controller 1, mutual speeches between the branch telephone sets can be realized through usual call sending/receiving operations.

First, explanation will be briefly made as to the speeches between the respective branch telephone sets 4a to 4d and the controller 1. For example, when the branch telephone set 4a is put in its off-hook state, this causes the line circuit 21b to detect a state signal indicative of the off-hook state of the branch telephone set 4a and send it to the central processing unit 6 through the data bus 5.

The central processing unit 6 in turn, on the basis of a processing program and the state data of the respective branch telephone sets stored in the memory 7, recognizes the off-hook state signal received from the branch telephone set 4a as a call directed to the controller 1, and executes the calling processing to the controller 1 through the data bus 5 and the line circuit 2a.

In the controller 1 as the call receiver, one of indicators LED (which are provided on the control panel to correspond to the send/receive keys L01 to L12) corresponding to the branch telephone set 4a of the caller-flashes and at the same time, a buzzer provided in the controller rings, thus informing the controller user of the incoming call from the branch telephone set 4a.

When the operator of the controller 1, in answer the incoming call, depresses one of the send/receive keys corresponding to the flashing indicator LED, this causes its state signal (indicative of the depression of the send/receive key corresponding to the branch telephone set 4a) to be transmitted to the central processing unit 6 through the line circuit 2a and the data bus line 5.

The central processing unit 6, when receiving the state signal indicative of the depression of the send-/receive key corresponding to the branch telephone set 4a from the controller 1, recognizes it as a controller operator's answering signal and controls to achieve establishment of a speech channel between the controller 1 and the branch telephone set 4a, thus enabling conversation between the both.

In this way, the controller 1 can realize a usual extension speech with each of the branch telephone sets. In addition to the above extension telephone function, the conference telephone system of the present embodiment can also realize a conference function in such a manner that a conference is called through the controller 1 for the respective branch telephone sets 4a to 4d, which will be detailed later.

Figure 3:
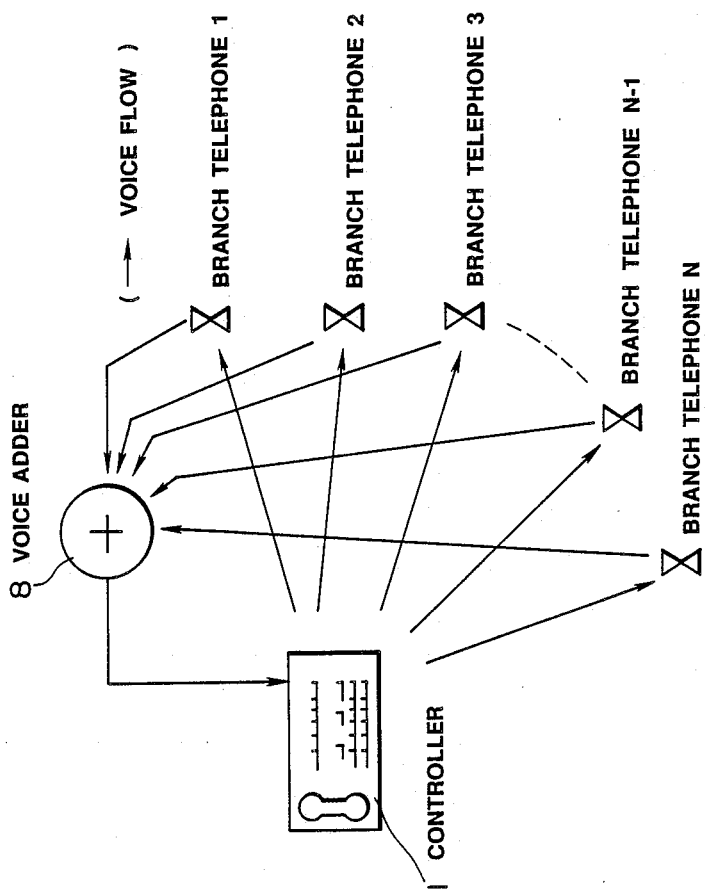
FIG. 3 shows, in a model form, a conception of forming speech channels in the conference telephone system as an embodiment of a conference-channel forming method in accordance with the present invention.

That is, with the conference telephone system, as shown in FIG. 3, there are formed between the controller 1 and ones of the branch telephone sets selected by the controller 1 as conference participators, at the same time, first one-way speech channels through which a voice signal is transmitted from the controller 1 to the selected branch telephone sets as well as second one way speech channels through which voice signals, issued from the selected branch telephones and added together at the voice adder circuit 8, are transmitted to the controller 1.

In the above speech channel forming method, mutual speeches between the controller 1 and the respective branch telephones, i.e., in a one-to-plurality relationship can be realized, but mutual speeches between the branch telephones become impossible.

Explanation will be sequentially made as to how to form such speech channels and how to realize the conference through the speech channels thus formed.

First, when a conference convoker, i.e., a chairman operator operates the controller 1 according to such a procedure as shown in FIG. 4, a conference is convoked.

More specifically, when the operator of the controller 1 wishes to call a conference, he or she as a conference convoker conducts the following procedures (1) to (3).

(1) Confirming that the controller 1 is in its idle state, he depresses the conference key (DIR) and then in order to set participator members for the conference, sequentially depresses corresponding ones of the send-/receive keys (L01 to L12).

(2) After finishing the setting of all the participators, he again depresses the conference key (DIR). This causes the realization of the participator convocation and registration, so that the completion of the conference start procedure is informed to the central processing unit 6.

The central processing unit 6, when receiving the information telling the completion of the conference start procedure, starts its accessing operation to the participator branch telephones. At this time, the central processing unit 6 rings branch telephones in the idle state and forcingly cuts off the speeches of branch telephones in the off-hook state, whereby the aforementioned speech channels for the conference are immediately formed.

(3) As shown in FIG. 4, the conference end procedure is provided by the operator of the controller 1 depressing the release key (RLS) of the controller 1. This causes the respective branch telephones as the participator members as well as the controller 1 itself to be all shifted to the idle state.

Shown in FIG. 5(a) and (b) are the state transition charts of the controller 1 and associated branch telephones for explaining the conference run procedure.

As shown in FIG. 5, when the operator of the controller 1 depresses the conference key (DIR) during the idle state (S1 in FIG. 5(a)) of the controller 1, this causes the controller to be shifted to a conference member setting/registering state (S2 in FIG. 5a)), in which state ones of the branch telephones corresponding to ones of the send/receive keys depressed by the controller operator are sequentially set and registered as conference participator members.

In the conference member setting/registering state (S2 in FIG. 5(a)), while the controller 1 detects the depression of send/receive keys, the controller continues its setting and registering operation to set and register the branch telephones corresponding to the depressed send/receive keys as conference participator members. If the controller 1 detects the re-depression of not any send/receive keys but the conference key (DIR), it is shifted to a conference speech state (S3 in FIG. 5(a)).

When the branch telephones as the conference participator members are called by the controller 1 in the conference speech state (S3 in FIG. 5(a)), some of the branch telephones in an idle state (S4 in FIG. 5(b)) are shifted to a ringing state (S5 in FIG. 5(b)), and the other branch telephones in a speech state (S6 in FIG. 5(b)) are immediately shifted to a conference speech state (S7 in FIG. 5(b)).

In the conference speech state (S7 in FIG. 5(b)) of the branch telephones, when the chairman operator of the controller 1 depresses the release key (RLS) on the controller 1 to put an end to the conference, the controller 1 per se is immediately returned to the idle state (S1 in FIG. 5(a)) and at the same time the branch telephones in the ringing state (S5 in FIG. 5(b)) are also returned to the idle state (S4 in FIG. 5(b)).

During execution of the conference telephone function, the central processing unit 6 grasps the processing flow of the entire conference telephone system by causing the memory 7 to store and renew the states (S4 to S7 in FIG. 5(b)) of the branch telephones as the conference participator members and the states (S1 to S3 in FIG. 5(a)) of the controller 1 according to port numbers previously allocated thereto.

There is shown in FIG. 6 an example of storage configuration in the memory 7. More specifically, FIG. 6(a) shows a branch telephone state table T1 listing the states of the respective branch telephones, FIG. 6(b) shows a controller state table T2 listing the current state of the controller 1, and FIG. 6(c) shows a conference member registration table T3 listing, in the form of allocated port numbers, conference participator members as branch telephones selected by the depression of any of the send/receive keys (L01 to L12) of the controller 1. In the conference member registration table T3, branch telephone port numbers selected by the depression of the send/receive keys (L01 to L12) are registered sequentially from the top (FF: no registration part) and at the end of the conference, these port numbers are cleared.

Also separately stored in the memory 7 is a processing program for realizing the above conference telephone processing. The central processing unit 6 executes the conference telephone processing according to command contents instructed every time from the controller 1 under control of the processing program previously stored in the memory 7.

Explanation will finally made as to the algorithm according to which the central processing unit 6 executes the conference telephone function with use of the processing program stored in the memory 7, by referring to a flowchart of FIG. 7.

Figure 7A:
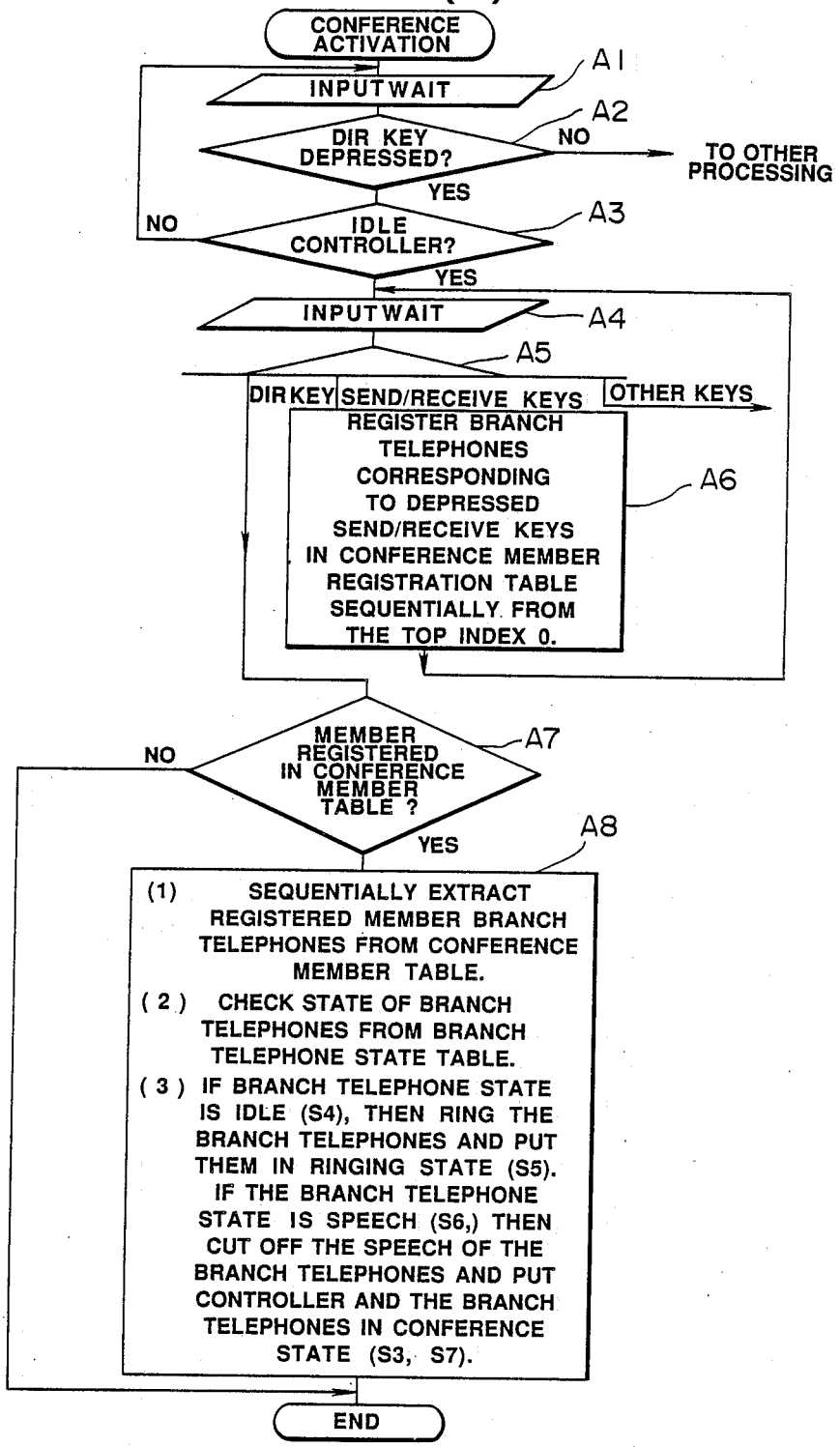
FIG. 7a–7b are flowchart showing an example of conference speech processing in the conference telephone system.

FIG. 7(a) shows the processing flow of the whole conference telephone system of the present embodiment when a conference is called through the controller 1.

In FIG. 7(a), when the central processing unit 6 receives a key input from the controller 1 in its input awaiting state (step A1), the unit 6 first judges whether or not the depressed key corresponds to the conference key (DIR) (step A2).

When judging that the depressed key is not the conference key (DIR), the central processing unit 6 shifts its operation to the operation corresponding to the key input other than the conference telephone operation.

If the central processing unit 6 judges that the key input corresponds to the conference key (DIR), then the unit 6 checks whether or not the controller 1 is in the idle state (refer to S1 in FIG. 5(a)) (step A3). When the controller is in the idle state, the central control unit 6 is put in the key input awaiting state (step A4).

In the key input awaiting state, when the central control unit 6 receives a key input, it judges whether the input key is the conference key DIR) or one of the send/receive keys (L01 to L12) or another key (step A5).

When the central processing unit 6 judges at the step A5 that the input key is one of the send/receive keys (L01 to L12), the unit 6 causes the port number of one of the branch telephones corresponding to the depressed send/receive key to be registered in the conference member registration table T3 sequentially from the top index 0 (step A6). At this time, each time the registration of one port number for one branch telephone is completed, the central processing unit 6 is put in the key input awaiting state in which the unit 6 waits for the depression of one of the send/receive keys corresponding to one of the branch telephones to be next registered. On the side o the controller 1, the depression of send/receive keys corresponding to all the branch telephones as the conference participator members is repeated until the registration of all the conference member branch telephones is completed. That is, the steps A5 and A6 are repeatedly executed to perform the conference participator member registration.

After the registration of all the conference participator members is completed, the operator of the controller 1 again pushes the conference key (DIR) to prompt the members to start the conference.

In the step A5, when the central processing unit 6 judges that the depressed key input corresponds to the redepression of the conference key (DIR), the unit 6 then examines the presence or absence of the conference members registered in the conference member registration table T3 of the memory 7 (step A7) and in the absence of the registered members, the units 6 terminates the conference telephone processing without executing any processings.

The judgement of the presence of the registered members at the step A7, on the other hand, causes the central processing unit 6 to sequentially read the branch telephone port numbers corresponding to the registered members from the conference member registration table T3 (step A8-1) and further to check the current states of the registered member branch telephones while retrieving the branch telephone state table T1 of the memory 7 (step A8-2).

As a result of the check, when the central processing unit 6 determines that the registered members are in the idle state (refer to S5 in FIG. 5(b)), the unit 6 causes the idle state telephones to be shifted to the ringing state (refer to S5 in FIG. 5(b)); whereas, when the unit 6 determines that the registered members are in the speech state (S6 in FIG. 5(b)), the unit causes the speeches of the speech state telephones to be forcingly cut off, so that these telephones and the controller 1 are shifted to the conference speech state (refer to S3 in FIG. 5(a) and S7 in FIG. 5(b)) (step A8-3). In the latter case (when the corresponding branch telephones are in the speech state), in particular, such conference speech channels as shown in FIG. 3 are formed automatically and unconditionally through the same processing of the central processing unit 6.

Figure 7B:
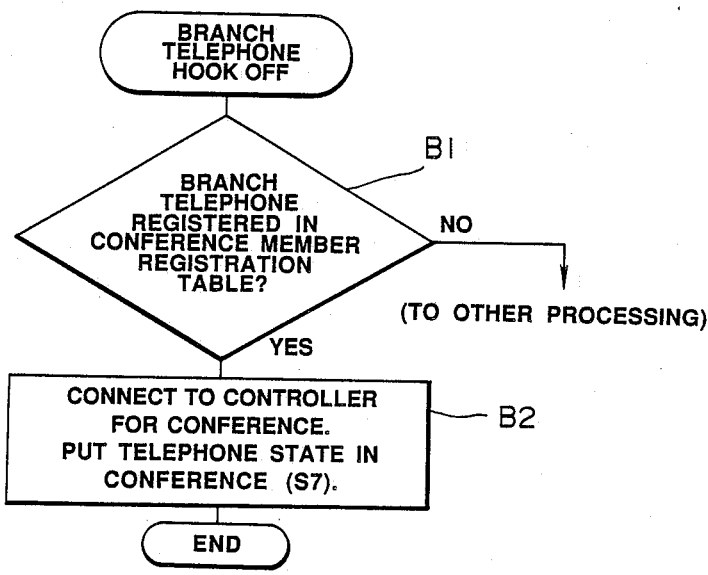

When the corresponding branch telephones are put in the off-hook state in response to the conference call of the ringing operation, the central processing unit 6 starts such a processing operation as shown in FIG. 7(b) with respect to the branch telephones of the off-hook state.

More in detail, when the branch telephone ringing under the above condition is put in the off-hook state in answer to the ringing call, the central processing unit 6 detects the off-hook state and examines whether or not the port number of the corresponding branch telephone is registed in the conference member registration table T3 of he memory 7 (step B1).

And only when the corresponding port number is registered in the conference member registration table T3, the central processing unit 6 forms such conference speech channels as eariler shown in FIG. 3 between the corresponding branch telephone and the controller 1 and puts the branch telephone corresponding to the registered member in the conference speech state (refer to S7 in FIG. 5(b)) (step B2).

Since the thus formed conference speech channels include first one-way speech channels through which a voice signal is transmitted in one way from the controller 1 to the respective branch telephones and second speech channels through which voice signals issued from these branch telephones are sent to and added together at the adder circuit 8 and then transmitted to the controller 1 as has been already explained earlier, the mutual speeches between the branch telephones can be completely restricted. Accordingly, the conference convoker operating the controller 1, i.e., the chairman operator can have the complete initiative in the conference through the mutual speech between the controller 1 and the respective branch telephones in a one-to-plurality relationship and therefore can reliably hold the command of the conference.

The conference telephone system of the present embodiment has advantages that the communication configuration of the conference speech function of the system can also be applied even when it is desired for the chairman operator to receive confirmation responses as to certain conditions from a plurality of parties, in which case the system can efficiently process such conformation operation by asking such a question to the plurality of parties at the same time, and so on.

In the conference speech mode, the controller 1 and the respective branch telephones of the conference registered members can start their restoring operation (the operation for going out of the conference speech state) independently at the both sides of the controller and branch telephones. The restoring operations of the controller and each branch telephone by the central processing unit 6 are shown in FIG. 7(c) and (d) respectively as an example.

Figure 7C:
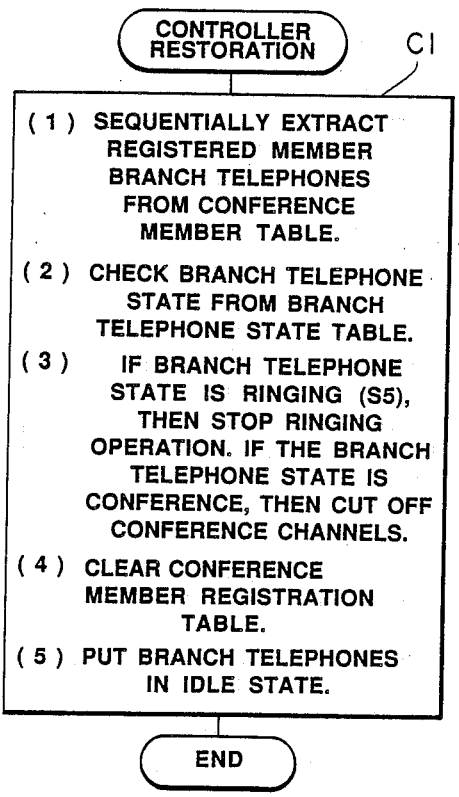

In the restoring operation of the controller 1 shown in FIG. 7(c), the central processing unit 6. When receiving signal indicative of the depression of the release key (RLS) from the controller 1, checks the current states of the corresponding branch telephones by referring to the branch telephone state table T1 in the memory 7 while sequentially reading out the port numbers of the branch telephones corresponding to the corresponding conference members from the conference member registration table T3 of the memory 7 (step C1-1).

When the central processing unit 6 determines that the branch telephones corresponding to the registered members are in the ringing state (refer to S5 in FIG. 5(b)), the unit 6 immediately stops the ringing operation; while, when the central processing unit 6 determines that the branch telephones are in the conference speech state (refer to S7 in FIG. 5(b)), the unit 6 releases the previously formed speech channels see FIG. 3), that is, cuts off the speech channels (step C1-3).

Thereafter, the central processing unit 6 control to clear the conference member registration table T3 in the memory 7 (step C1-4) and to cause the branch telephones of the registered members to be put in the idle state (see S4 in FIG. 5(b)) step C1-5), at which stage the controller restoration operation is terminated.

Through such a series of processings through the central processing unit 6, the speech channels formed between the controller 1 and the branch telephones of the conference registered members can be quickly released, and not only the usual private branch exchange function but also the convocation of new members for the next conference can be realized.

Figure 7D:
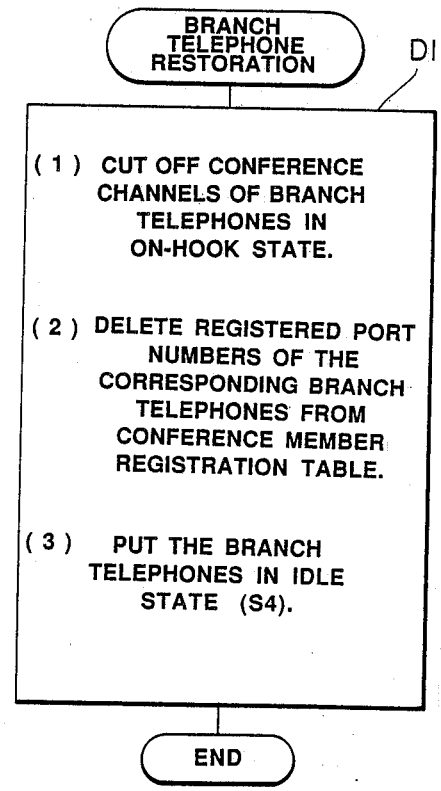

In the restoration operation of each of the branch telephones as the registered conference members, on the other hand, the central processing unit 6, when the branch telephone is put in the on-hook state, executes such processing as shown in FIG. 7(d).

More in detail, the central processing unit 6, when receiving a signal indicative of an on-hook state from any of the registered member branch telephones, first executes the conference speech channel cut-off operation to cut off the conference speech channel formed between the branch telephone of the on-hook state and the controller (step D1-1).

Subsequently, the central processing unit 6 retrieves the conference member registration table T3 of the memory 7 and deletes the registered port number of the corresponding branch telephone (at this time, in the on-hook state) among the registered member numbers (step D1 D1-2).

Therafter, the central processing unit 6 causes the state of the branch telephone in question to be restored to the idle state (see S4 in FIG. 5(b)) (step D1-4).

Through such a series of processings through the central processing unit 6, the conference is completed or only the branch telephone put in the on-hook state by the associated operator for some reason is released from the conference speech channels, whereby the branch telephone is restored to the usual state (ilde state) of an extension telephone.

Figure 8:
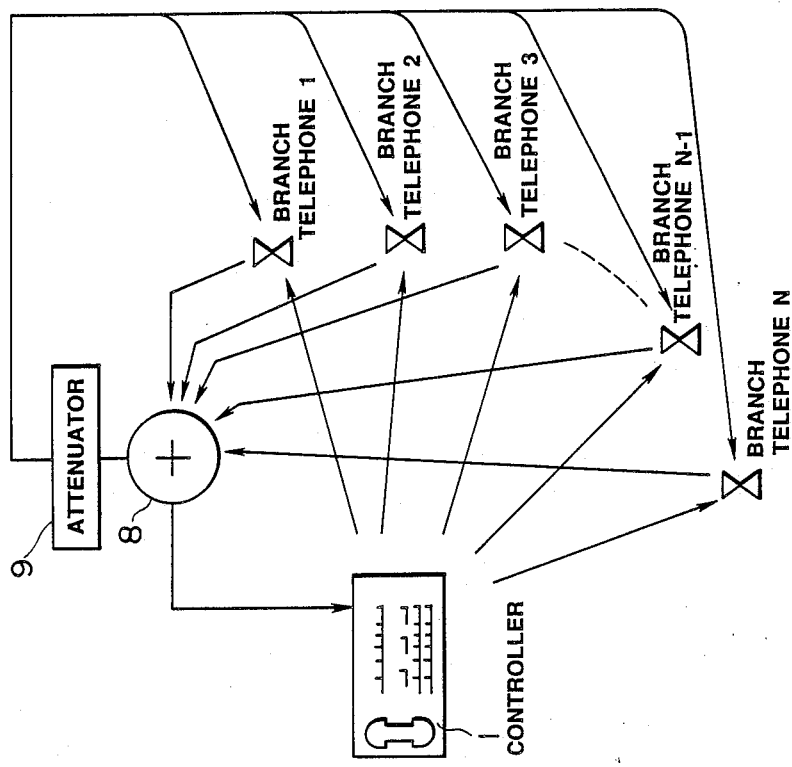
FIG. 8 conceptionally shows, in a mode form, a conference speech-channel forming method as another embodiment of the conference speech-channel forming method in accordance with the present invention.

Although the conference speech channels have been fored as shown in FIG. 3 in the foregoing embodiment, the conference speech channels may be formed as shown in FIG. 8.

In the conference speech channels formed as shown in FIG. 8, a part of an output of the adder circuit 8 for adding voice signals received from branch telephones is suitably attenuated at an attenuator 9 and then fed back to the branch telephones corresponding to the registered conference members through second speech channels.

The additional provision of the second speech channels enables the realization of mutual speeches between the operators of the branch telephones and confirmation of mutual speech contents without disturbing the aforementioned main conference speech. Since the voice of the operator of the each branch telephone is also fed back to its own handset, the attenuation of the attenuator 9 must be selected to be at such a level that the fed-back voice of the branch telephone operator does not sound offensive to his ear.

In the foregoing embodiment, a special extension telephone set having thereon the send/receive keys, conference key, release key and so on has been prepared as the controller 1, conference members have been convoked only through the special extension telephone set of the controller 1, and the above conference speech channels has been formed. However, it goes without saying that, in the event where all the extension telephone sets connected to the speech channel network 3 in the private branch exchange are telephone sets of such type (so-called electronic multi-function telephone sets) that such key setting can be realized, such a special device as the controller 1 becomes unnecessary, conference members can be called through all the extension telephone sets, and the above conference speech channels can be formed.

What is claimed is:

1. A conference speech channel forming method based on a private branch exchange in which an extension telephone set to be operated by an operator as a conference chairman is logically connected to a plurality of extension telephone sets to be operated by a plurality of operators as conference participators through said private branch exchange to establish conference speech channels between said extension telephone sets, said method comprising:
   a first step of forming first ones of said conference speech channels to transmit a voice signal from the extension telephone set of said chairman operator to said plurality of extension telephone sets of said participator operators in parallel therewith; and
   a second step of forming second ones of the conference speech channels to add together a plurality of voice signals issued from the plurality of extension telephone sets of the participator operators through a voice adder circuit to generate an addition voice signal and then to transmit said addition voice signal to the extension telephone set of the chairman operator.

2. A conference speech channel forming method based on a private branch exchange as set forth in claim 1, wherein ones of said plurality of extension telephone sets to be operated by said plurality of operators as the conference participators, when responding to individual designations from said extension telephone set to be operated by said operator as the conference chairman, are registered as the conference participators, and said speech channels are formed between the extension telephone set to be operated by the chairman operator and said registered extension telephone sets.

3. A conference speech channel forming method based on a private branch exchange as set forth in claim 2, wherein, when said extension telephone sets subjected to said individual designations from said extension telephone set to be operated by said chairman operator are in their speech mode, the speeches are forcingly cut off to form said speech channels.

4. A conference speech channel forming method based on a private branch exchange as set forth in claim 1, further comprising a third step of forming third ones of said conference speech channels to attenuate by a predetermined amount a part of said addition voice signal as an output of said voice adder circuit at an attenuator and then to feed it back to said plurality of extension telephone sets of said participator operators.

5. A conference speech channel forming method based on a private branch exchange as set forth in claim 1, further comprising a step of releasing said speech channels formed based on a suitable conference end operation of said extension telephone set to be operated by said chairman operator.

6. A conference speech channel forming method based on a private branch exchange as set forth in claim 5, further comprising releasing said speech channels formed between said extension telephone set to be operated by said chairman operator and ones of said plurality of extension telephone sets of said participator operators which are put in their on-hook state during the conference speech.

7. A conference telephone system comprising:
   a plurality of first extension telephone sets connected to a speech channel network;
   a second extension telephone set connected to said speech channel network and having at least branch-extension-telephone designating keys for individually designating said first extension telephone sets and a conference key for designating a conference speech mode;
   conference participator member registration means for registering, as one of conference participator members, one of the first extension telephone sets corresponding to one of said branch extension telephone designating keys depressed in said conference speech mode designated with said conference key of said second extension telephone set;
   voice addition means for adding voice signals together; and
   conference speech-channel forming means for detecting a registration completion to said conference participator member registration means and calling ones of the first extension telephone sets corresponding to the registered conference partitipator members to form, between ones of the first extension telephones which responded to the calling and the second extension telephone set, first speech channels through which a voice signal issued from the second extension telephone set is transmitted in one way parallelly to the first extension telephone sets and second speech channels through which voice signals issued from said ones of the first extension telephone sets are added together at said voice addition means and then transmitted to the second extension telephone set.

8. A conference telephone system as set forth in claim 7, wherein said branch-extension-telephone designating keys provided to said second extension are send/receive keys for controlling individual transmission and reception of said plurality of first extension telephone sets.

9. A conference telephone system as set forth in claim 8, wherein said conference participator member registration means registers, as said conference participator members, ones of said first extension telephone sets which responded to individual calling based on operations of said send/receive keys, and said conference speech channel forming means forms said first and second speech channels between said second extension telephone set and said first extension telephone sets registered as the conference participator members.

10. A conference telephone system as set forth in claim 7, wherein said conference speech-channel forming means, when said called first extension telephone sets are in a speech state, forcingly cuts off the speeches of the called first extension telephone sets and forms said first and second speech channels between said first extension telephone sets and said second extension telephone.

11. A conference telephone system as set forth in claim 7, wherein said second extension telephone set further has a release key for designating an end of said conference speech mode and said conference speech channel forming means detects an operation of said release key and releases said first and second speech channels.

12. A conference telephone system as set forth in claim 11, wherein said conference speech-channel forming means, when ones of said first extension telephone sets connected to said first and second speech channels are put in an on-hook state, releases ones of the first and second speech channels connected to said ones of the first extension telephone sets in said on-hook state.

13. A conference telephone system as set forth in claim 7, further comprising attenuation means for attenuating by a predetermined amount a part of a voice addition output of said voice addition means, and wherein said conference speech-channel forming means further forms third speech channels through which an output of said attenuation means is fed back to ones of said first extension telephone sets corresponding to said conference participator members.

* * * * *